United States Patent [19]

Zarkowski

[11] Patent Number: 5,041,811
[45] Date of Patent: Aug. 20, 1991

[54] OPTIMUM ENGINE IDLING TIME INDICATOR

[76] Inventor: Paul A. Zarkowski, 550 172nd Ave., Bellevue, Wash. 98008

[21] Appl. No.: 572,137

[22] Filed: Aug. 24, 1990

[51] Int. Cl.$^5$ .............................................. B60Q 1/00
[52] U.S. Cl. .................................. 340/439; 340/449
[58] Field of Search ................ 340/457, 439, 449, 438

[56] References Cited

U.S. PATENT DOCUMENTS

| | | | |
|---|---|---|---|
| 1,862,994 | 6/1932 | Zubaty et al. | 340/449 X |
| 3,409,873 | 11/1968 | Duffy | 340/449 X |
| 4,075,998 | 2/1978 | Krauss et al. | 123/179 BG X |
| 4,163,186 | 7/1979 | Haley | 340/636 X |
| 4,213,125 | 7/1980 | Watanabe | 340/449 X |
| 4,890,088 | 12/1989 | Woodell | 340/459 |

Primary Examiner—Joseph A. Orsino
Assistant Examiner—Brian R. Tumm

[57] ABSTRACT

A device for indicating the optimum idling time of an engine after ignition. A detector circuit senses the voltage drop caused by the load of the starter on the power line and starts the timer. The optimum idling time is determined from the ambient temperature. A LED is illuminated after ignition and is extinguished after the optimum idling time. The device is designed to fit in the receptacle of a standard cigarette lighter and requires no connections beyond those available there.

3 Claims, 1 Drawing Sheet

OPTIMUM ENGINE IDLING TIME INDICATOR

BACKGROUND

1. Field of Invention

This invention relates to vehicles with internal combustion engines, specifically to an indicator designed to lengthen the useful life of the engine.

2. Discussion of Prior Art

The life of most internal combustion engines can be extended if adequate time is allowed for the oil to heat up and flow over the bearings before the engine is loaded or the rpms are increased.

Heretofore, a variety of indicators and gauges have been manufactured to monitor oil pressure, flow and temperature.

One such type of indicator consists of a temperature monitor in contact with the engine. The indicator is activated initially, and deactivated after the engine temperature passes a set threshold value. Many of these monitors indicate typical operating temperatures, and were not designed with optimum idling time and fuel efficiency as a goal. Many users disregard these monitors for that reason. The alteration of the monitor's threshold would require a significant effort to rewire the circuitry.

Other types of gauges measures oil pressure, water temperature and total idling time. However the user must determine the optimum value of each. Since this value may change based on ambient temperature, it would require effort from the user to maintain a consistent level of warm-up.

An earlier patent U.S. Pat. No. 4,178,580 described a device to limit excessive idling time. However, a significant modification of the vehicle would be required. Access to the ignition, among other systems, would be required for installation.

Many users, therefore, would find it desirable to have a easily installed device to indicate optimum idling time.

Objects and Advantages

Accordingly, the objects and advantages of my invention are, to provide an engine saving device to easily and reliably determine the optimum warm-up time for the ambient temperature, and to provide an engine saving device which is easily installed and requires no more space or electrical connections than those available in the receptacle of the cigarette lighter.

Figure 1:
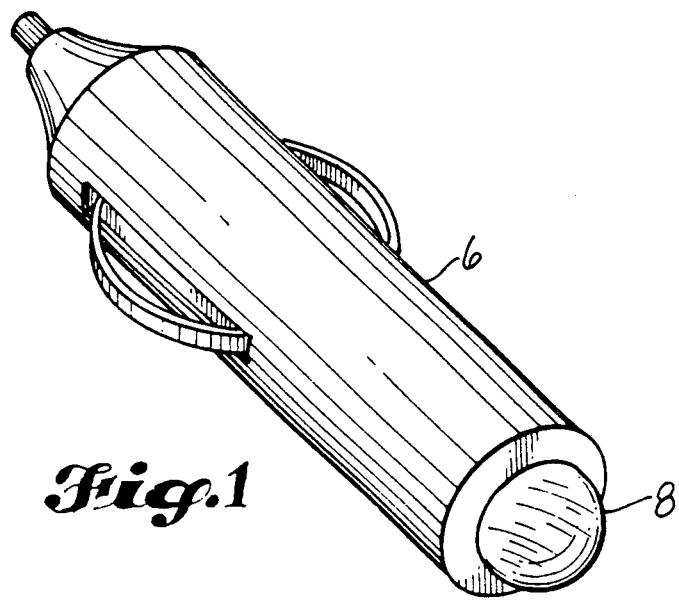
FIG. 1 is a perspective view of my invention.

List of Reference Numerals 6 housing
8 lens
10 power line
12 earth
14 negative slope detector
16 rectifier
18 storage capacitor
20 transistor
22 thermistor
24 timing capacitor
26 comparator
28 LED

DESCRIPTION OF INVENTION

FIG. 1 shows the indicator assembly according to the preferred embodiment of the invention. The far end of the housing 6 has the positive and negative contacts and the shape to fit in the receptacle of a standard cigarette lighter. A protective lens 8 is mounted on the near end.

Figure 2:
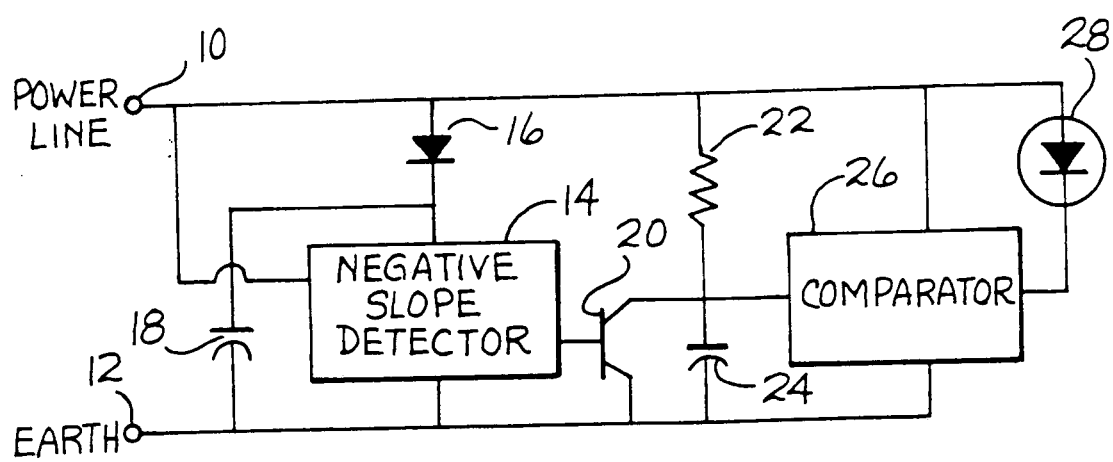
FIG. 2 is a schematic view of the circuitry of my invention.

FIG. 2 show the circuitry of the preferred embodiment. The power line 10 is connected as a signal to the negative slope detector 14. The negative slope detector 14 has a rectifier 16 and storage capacitor 18 attached to its supply input. The negative slope detector 14 drives the base of a transistor 20. The collector of the transistor 20 is attached to the positive terminal of a timing capacitor 24, as is a thermistor 22 and the input of a comparator 26. The output of the comparator 26 is connected to a LED 28. The power line 10 is connected directly to the thermistor 22, comparator 26 and LED 28.

OPERATION OF THE INVENTION

The device shown in FIG. 1 is plugged into the receptacle of a standard cigarette lighter. When the engine is started the LED 28 is illuminated and is not extinguished until the optimum idling time is over.

The operation of the device is achieved by the schematic shown in FIG. 2. The negative slope detector 14 detects the drop in the power line 10 caused by the activation of the starter motor. The negative slope detector's 14 supply of power is protected from excessive drops in the power line 10 by the rectifier 16 and storage capacitor 18. With a signal indicating that the engine has been started on the power line 10, the negative slope detector 14 turns on the transistor 20 which completely discharges the timing capacitor 24. A voltage of near 0V on the timing capacitor causes the comparator 26 to illuminate the LED 28. The comparator 26 will not extinguish the LED 28 until the voltage on the timing capacitor 24 exceeds the threshold voltage. The timing capacitor 24 is charged by the thermistor 22. The temperature dependence of the delay in extinguishing the LED 28 is acheived by the thermistor 22. At 0 C, the total delay is typically 35 seconds, at 25 C, the delay is 10 seconds.

While the above description contains many specificities, these should not be construed as limitations on the scope of the invention but rather as an exemplification of one preferred embodiment thereof. Many other variations are possible. For example, the function of temperature dependent delay currently filled by the thermistor and capacitor above could be filled by an oscillator and counter with a maximum count dependent on temperature. The detection of the start of the engine could use a positive slope detector instead of a negative slope detector. Accordingly, the scope of the invention should be determined not by the embodiments illustrated but by the appended claims and their legal equivalents.

I claim:

1. An optimum engine idling time indicator for a vehicle having an internal combustion engine, an electric starter motor and a power line common to both the starter motor and a storage battery comprising:

a detection circuit to detect electrical loading of said power line by the starter motor, a time delay means that is initialized by said detection circuit, a signaling means that is activated during the delay of said time delay means, wherein said power line is accessed via a receptacle of a cigarette lighter.

2. The device of claim 1 wherein the duration of said time delay means is a function of temperature.

3. The device of claim 1 wherein said signaling means is a LED.

* * * * *